United States Patent Office 2,705,213
Patented Mar. 29, 1955

2,705,213

COMPOSITION FOR CONTROL OF MITE AND INSECT PESTS

Eugene E. Kenaga, Midland, Mich., assignor to The Dow Chemical Company, Midland, Mich., a corporation of Delaware No Drawing. Application August 24, 1949,
Serial No. 112,183

3 Claims. (Cl. 167—30)

This invention is concerned with improved parasiticidal compositions including a mixture of two toxicant materials.

1,2,4,5,6,7,8,8-octachloro-4,7-methano-3a,4,7,7a-tetrahydroindane is a known chemical compound having the following formula:

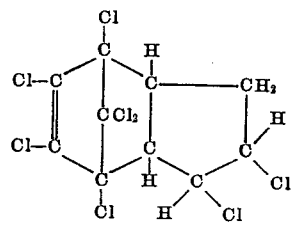

This compound is white crystalline material melting at about 97.5°–99° C. It is substantially insoluble in water and soluble at room temperature in most common organic solvents, including the highly refined paraffin hydrocarbons. The compound is familiarly known as "Chlordane" and shall hereinafter be so called. It has recently shown promise as an insecticide toxicant for the control of a number of agricultural and household pests.

It has been discovered that Chlordane may be combined with 4'-chlorophenyl 4-chlorobenzene sulfonate to obtain a composition having very desirable properties for the control of plant parasites. When compounded with a carrier in spray and dust compositions, the toxicant mixture appears to exert a toxicity against insects and mites which is greater than additive with respect to that inherent in the constituents of the mixture when employed alone. The use of the mixture of toxicants permits the control of plant parasites with smaller amounts of Chlordane and of 4'-chlorophenyl 4-chlorobenzene sulfonate than would otherwise be required. A further advantage resides in the prolonged residual effect exerted by the mixture. Thus, a single application of the mixture gives excellent control of such organisms as *Tetranychus bimaculatus* (two-spotted spider mite), *Bryobia praetiosa* (clover mite), and *Paratetranychus pilosus* (European red mite) for periods ranging up to several months.

In operating in accordance with the present invention, any suitable amount of Chlordane may be employed in combination with 4'-chlorophenyl 4-chlorobenzene sulfonate to obtain compositions in which the toxicants are mutually activating. The exact amounts of the toxicants in the mixture do not appear to be critical. The preferred proportions are dependent upon the type of composition in which the mixture of toxicants is applied, the organism concerned, and the period for which the residual action and control is desired. Ordinarily from about 0.009 to 25 parts by weight of Chlordane is employed with each 1 part of 4'-chlorophenyl 4-chlorobenzene sulfonate. In spray compositions, the proportions of toxicants and dosages applied should be so integrated that the content of Chlordane is at least 0.018 pound and the content of 4'-chlorophenyl 4-chlorobenzene sulfonate is at least 0.1 pound per 100 gallons. The exact dosages employed are determined by the organism to be controlled and the tolerance of the host plant for the toxicant mixture. In dusts, good results are obtained with compositions containing from 1 to 10 per cent by weight of the mixture of toxicants. In concentrates, the mixture of toxicants may constitute from about 5 to 95 per cent by weight of the ultimate composition.

It is to be understood that either component may be employed in excess of the indicated preferred proportion. In such a composition the excess of either parasiticide toxicant in no way detracts from the improved results obtainable with the basic synergistic mixture.

The new toxicant mixtures may be employed with an inert material as a carrier, e. g. a finely divided solid, water, a solvent liquid of organic origin, a wetting and dispersing agent, an aqueous emulsion, or any suitable combination of these. In such formulations the mixture of toxicants may be present (1) in relatively high proportion to provide a concentrate adapted for further dilution to produce spray or dust compositions, or (2) in very low proportion to provide compositions suitable for application without further modification.

In the preparation of sprays, the Chlordane and 4'-chlorophenyl 4-chlorobenzene sulfonate may be separately dispersed in the water or other liquid carrier. A further mode of operation includes mixing the toxicants with bentonite, diatomaceous earth, or talc, and dispersing the resulting mixture in water. Any compatible wetting or dispersing agent may be employed in the spray formulations.

In the preparation of dusts, the Chlordane and 4'-chlorophenyl 4-chlorobenzene sulfonate may be mixed with the finely divided carrier in any suitable manner. Operable carriers include volcanic ash, diatomaceous earth, clays, wood flour, pyrophyllite and the like.

Where a concentrate is desired, the toxicants may be dispersed with wetting and dispersing agents to obtain products adapted to be dispersed in water or other aqueous spray composition. Alternatively, the toxicants may be separately compounded in concentrate form and mixed together upon dilution in the spray tank. In another mode of operation, the mixture of toxicants may be dispersed in a finely divided solid carrier to produce a concentrate adapted subsequently to be diluted with additional carrier to form dusts.

Wetting and dispersing agents adapted to be employed in the various compositions as suggested above include sodium lauryl sulphate, alkyl aryl sulfonate (Nacconol NR), alkyl aryl sulfonate (Oronite No. 5), alkylated aryl polyether alcohol (Triton X100), dioctyl sodium sulfosuccinate (Aerosol OT), polyoxyethylene sorbitol oleate laurate (Atlox 1045A), substituted benzoic alkyl sulfonic acid (Daxad No. 27), and the polyethylene derivative of sorbitan trioleate (Tween 85).

4'-chlorophenyl 4-chlorobenzene sulfonate is a white crystalline solid melting at 81°–83° C., and having the following formula:

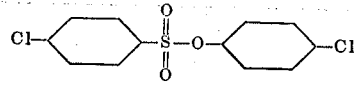

The following examples illustrate the invention but are not to be construed as limiting the same.

Example 1

A parasiticidal composition was prepared in the form of a wettable powder by grinding 50 parts by weight of 4'-chlorophenyl 4-chlorobenzene sulfonate, 1 part of Nacconol NR, 2 parts of Daxad No. 27, and 47 parts of fuller's earth. This product is hereinafter referred to as "Concentrate A." In a further operation, 40 parts by weight of a commercially available product marketed as technical Chlordane and containing about 60 per cent by weight of Chlordane and 25 per cent of other related compounds, 17.5 parts of fuller's earth, 2 parts of Daxad No. 27, and 0.5 part of Nacconol NR were mixed and ground together to produce a composition hereinafter known as "Concentrate B."

The respective concentrates were dispersed in water to prepare spray compositions having the following concentrations of toxicant per 100 gallons:

No. 1—2 pounds of 4'-chlorophenyl 4-chlorobenzene sulfonate

No. 2—1/32 pound of technical Chlordane

No. 3—2 pounds of 4'-chlorophenyl 4-chlorobenzene sulfonate and 1/32 pound of technical Chlordane The three spray compositions were employed for the control of southern army worm on mature cranberry bean plants. In such operations, the bean foliage was wet with the indicated composition, the leaf surfaces allowed to dry, and the plants then infested with a known number of insect larvae. 72 hours following the infestation, the bean plants were examined to ascertain the degree of control of southern army worm, and the following situation, expressed in per cent kill, was found to exist:

| Composition: | Per cent kill |
|---|---|
| No. 1 | 6 |
| No. 2 | 25 |
| No. 3 | 50 |

Example 2

4'-chlorophenyl 4-chlorobenzene sulfonate and sodium lauryl sulphate were mixed in a ball mill to prepare a concentrate composition containing 32.5 per cent by weight of toxicant. This composition and Concentrate B were dispersed in water to prepare spray compositions having the following concentrations per 100 gallons:

No. 1—0.12 pound of 4'-chlorophenyl 4-chlorobenzene sulfonate
No. 2—0.5 pound of technical Chlordane
No. 3—0.12 pound of 4'-chlorophenyl 4-chlorobenzene sulfonate and 0.5 pound of technical Chlordane These spray compositions were employed for the control of two-spotted mite on mature cranberry bean plants. In such operations, the bean plants were infested with a known number of two-spotted spider mite adults 1 hour following the application of the spray compositions. 144 hours after infestation, the plants were examined to ascertain the control of mites, and the following situation, expressed in per cent kill, was found to exist:

| Composition: | Per cent kill |
|---|---|
| 1 | 0 |
| 2 | 0 |
| 3 | 33 |

In a further determination, the above described spray compositions were employed for the control of two-spotted spider mite eggs on mature cranberry bean plants. In such operations, the bean plants were infested with two-spotted spider mite adults 96 hours following the application of the spray compositions. 144 hours after infestation, the bean plants were examined to ascertain the control of two-spotted spider mite eggs which had been oviposited upon the plant surfaces, and the following percentage controls observed:

| Composition: | Per cent control of eggs |
|---|---|
| 1 | 14 |
| 2 | 0 |
| 3 | 70 |

Example 3

Aqueous spray compositions having the following toxicant concentrations were prepared as previously described from Concentrates A and B:

No. 1—0.5 pound of 4'-chlorophenyl 4-chlorobenzene sulfonate
No. 2—0.5 pound of technical Chlordane
No. 3—0.5 pound of 4'-chlorophenyl 4-chlorobenzene sulfonate and 0.5 pound of technical Chlordane These spray compositions were employed for the control of Mexican bean beetle larvae on mature cranberry bean plants. The application and infestation techniques followed in these operations were identical with those described in Example 1. Three days after the infestation, the following percentage kills were observed:

| Composition: | Per cent kill |
|---|---|
| No. 1 | 19 |
| No. 2 | 6 |
| No. 3 | 50 |

Example 4

An aqueous spray composition containing 3 pounds of Concentrate A and 5 pounds of Concentrate B is applied as a summer spray in an orchard of bearing Jonathan apple trees heavily infested with European red mite and two-spotted spider mite. The application is made with a conventional spray rig at a temperature of from 75°–80° F., and the spray employed in such amount as to provide for appreciable run-off from the treated leaf and woody surfaces. Unsprayed check plots are maintained through the orchard to provide a continuous source of reinfestation. As a result of the treatment, a commercial control of mite organisms is obtained and persists over the balance of the growing season. No significant foliage injury results from the application of the mixture of toxicants. The trees remain lush and green throughout the growing season, and are not subject to the leaf and fruit drop from mite attack which characterizes the trees in the check plots.

I claim:
1. A composition for the control of mite and insect pests, comprising as active toxic ingredients from 0.009 to 25 parts by weight of 1,2,4,5,6,7,8,8-octachloro-4,7-methano-3a,4,7,7a-tetrahydroindane in mixture with 1 part of 4'-chlorophenyl 4-chlorobenzene sulfonate, the active toxic ingredients of such composition being mutually activating.

2. A composition for the control of mite and insect pests, comprising a carrier and dispersed therein as active toxic ingredients from 0.009 to 25 parts by weight of 1,2,4,5,6,7,8,8 - octachloro-4,7-methano-3a,4,7,7a-tetrahydroindane in mixture with 1 part of 4'-chlorophenyl 4-chlorobenzene sulfonate, the active toxic ingredients of such composition being mutually activating.

3. A spray composition for the control of mite and insect pests, comprising an aqueous carrier and dispersed therein as active toxic ingredients from 0.009 to 25 parts by weight of 1,2,4,5,6,7,8,8 - octachloro - 4,7 - methano-3a,4,7,7a-tetrahydroindane in mixture with 1 part of 4'-chlorophenyl 4-chlorobenzene sulfonate, the active toxic ingredients of such composition being mutually activating and being present in the amount of at least 0.018 pound of Chlordane and 0.1 pound of 4'-chlorophenyl 4-chlorobenzene sulfonate per 100 gallons of spray.

References Cited in the file of this patent

UNITED STATES PATENTS

| | | |
|---|---|---|
| 2,538,513 | Kenaga | Jan. 16, 1951 |
| 2,538,728 | Kenaga | Jan. 16, 1951 |
| 2,538,729 | Kenaga | Jan. 16, 1951 |

OTHER REFERENCES

Lauger et al., Geigy pamphlet entitled "The Constitution and Toxic Effect of Botanicals and New Synthetic Insecticides" (1945), translated from Helvetica Chimica Acta, vol. XXVII, Fasciculus Quartus (April 27, 1944), pp. 1–42.

Metcalf, J. Econ. Ent., vol. 41, No. 6, Dec. 1948, pp. 875–882.

Knipling, Soap and Sanitary Chemicals, July 1947, pp. 127, 129, 131.

Scales et al., J. Econ. Ent., vol. 41, No. 3, June 1948, pp. 403–405.